Patented Nov. 2, 1926.

1,605,009

UNITED STATES PATENT OFFICE.

THEODORE A. SPAETH, OF CINCINNATI, OHIO, ASSIGNOR TO THE MATTHEWS SELECTED DAIRIES COMPANY, OF CINCINNATI, OHIO, A CORPORATION OF OHIO.

PROCESS OF MANUFACTURING BUTTER-FAT PRODUCTS.

No Drawing.  Application filed May 1, 1926. Serial No. 106,176.

My invention relates to a new and useful food product which has a new flavor and which may be used as a substitute for salad dressing, as a spread for bread and in many other ways. My invention further relates to processes for the manufacture thereof.

During the souring of cream or of milk containing a percentage of butter fat, the cream or milk passes through a stage when the acidity is within certain bounds when the flavor is very palatable and when it will serve as a very useful and healthful food product. During the ordinary souring of milk and cream products this stage is passed through in a comparatively short period so that unless it is consumed at the proper time the souring continues to such an extent that the palatable flavor is lost.

It is the object of my invention to provide a process for controlling the souring effect so that the product will reach the palatable stage and then so treating the products that no further souring will occur at least for an extended period. It is my object to provide a product made by my novel process which will remain, if properly packed, for as long a period as two weeks without losing its palatable flavor or otherwise deteriorating or becoming rancid.

While it may happen during the souring of milk or cream that the flavor desired may be obtained without a particular treatment, such as I will herein disclose such a product is not marketable, as, under ordinary conditions, it would deteriorate so rapidly that before it reached the consumer, it would no longer be salable. It is, of course, not my object to claim a partially soured milk broadly but to confine myself to such products which have been artificially treated and the souring controlled so as to provide a marketable product having permanent or relatively permanent characteristics.

As a specific example of my preferred process of manufacture, I provide a quart of lactic culture which may be of any desired type as long as it has the properties of promoting lactic acid fermentation. I permit this to ferment to an acidity of between .75 and .90 percent. I then provide a gallon of pure sweet cream which under normal conditions will have an acidity of approximately 0.09 and contain about 36% butter fat. I then mix the quart of lactic culture with the gallon of cream and set the mixture at a temperature approximately 76° Fahrenheit for the period necessary for a lactic acid content of approximately 0.90 to develop. When this percentage of acidity has developed, I mix the five quarts with a prepared milk mixture.

The milk mixture is preferably prepared by adding to 24 fluid ounces of milk about two ounces of gelatine. The milk is then heated slowly to a temperature of approximately 110° F. which will permit the gelatine to dissolve. The milk is then cooled to about 60° F. and the milk and the cream will then be ready to be mixed. I then mix the milk and the cream which has been prepared in accordance with the foregoing described treatment and allow it to stand in the cooler room for twelve hours, at the end of which time it will be ready for packing and shipping.

Prepared in such a manner I have found that the product will retain its flavor and palatability for as long a period as fourteen days providing that precautions which are ordinarily taken to prevent the souring of milk and cream products are taken with it.

While I have noted a preferred treatment, it is within the realms of equivalency to modify the treatment in some stages without departing from the principle involved which is broadly the treatment of cream with a lactic ferment, the control of the development of lactic acid, the treatment of a quantity of milk with gelatin, the cooling of the milk to prevent fermentation and the mixing of the two products and allowing them to stand for an extended period. When the product is packed and ready for shipment the acidity ranges from 0.70 to 0.90 the increase over the amounts noted at the time of mixing being occasioned by gradual fermentation during the standing period.

Having thus described my invention what I claim as new and desire to secure by Letters Patent is:

1. That process for manufacturing a food product which consists in treating sweet cream with a lactic culture, controlling the development of acidity, treating a smaller percentage of milk with gelatin, mixing the acidified cream with the treated milk and allowing the mixture to stand for about twelve hours.

2. That process for manufacturing a food product which consists in treating sweet cream with a lactic culture, controlling the acidification of the cream at a temperature approximately 76°, treating a quantity of milk with gelatin and warming the milk so as to dissolve the gelatin and then cooling the milk to about sixty degrees Fahrenheit, mixing the milk and cream and allowing the mixture to stand for an extended period so that an acidity of approximately nine tenths (of one) percent acidity will develop.

3. That process of treating cream to make a relatively permanent food product which consists in treating a quantity of cream with lactic culture in which an acidity of approximately 0.90 percent has developed and allowing the treated cream to stand at a moderate temperature until it has developed an acidity of approximately 0.90 percent, treating a lesser quantity of milk with gelatin and heating the milk so as to dissolve the gelatin, cooling the milk to approximately 60° Fahrenheit, and mixing the milk and cream and allowing the mixture to stand until it develops an acidity of from 0.70 to 1.00 per cent acid.

4. That process of treating cream which consists in controlling the acidification of the cream, mixing the acidified cream with a sweet milk to which gelatin has been added and allowing an acidity of approximately 0.90 to develop in said mixture.

THEODORE A. SPAETH.